(12) United States Patent
Guevin et al.

(10) Patent No.: US 9,438,630 B2
(45) Date of Patent: Sep. 6, 2016

(54) NETWORK ACCESS CONTROL USING SUBNET ADDRESSING

(71) Applicant: Adtran, Inc., Huntsville, AL (US)

(72) Inventors: Thomas F. Guevin, Nashua, NH (US); Ricky D. Rorex, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 73 days.

(21) Appl. No.: 14/515,402

(22) Filed: Oct. 15, 2014

(65) Prior Publication Data
US 2016/0112452 A1    Apr. 21, 2016

(51) Int. Cl.
*H04L 29/06* (2006.01)
*G06F 17/00* (2006.01)
*H04L 29/12* (2006.01)

(52) U.S. Cl.
CPC ............. *H04L 63/20* (2013.01); *H04L 61/103* (2013.01); *H04L 61/2015* (2013.01); *H04L 63/10* (2013.01); *H04L 61/6068* (2013.01)

(58) Field of Classification Search
CPC ... H04L 63/20; H04L 61/6068; H04L 63/08; H04L 67/42; H04L 61/2015; H04L 63/104; H04L 29/12933; H04L 45/745; H04N 21/6402

USPC ............... 709/203, 223, 225, 229; 726/1
See application file for complete search history.

(56) References Cited

U.S. PATENT DOCUMENTS

| 8,312,270 B1* | 11/2012 | Chou | H04L 63/101 713/168 |
| 2006/0031407 A1* | 2/2006 | Dispensa | H04L 29/12009 709/219 |
| 2013/0103836 A1* | 4/2013 | Baniqued | H04L 41/0803 709/226 |

* cited by examiner

*Primary Examiner* — Saleh Najjar
*Assistant Examiner* — Feliciano Mejia
(74) *Attorney, Agent, or Firm* — Smith Tempel Blaha LLC; Michael J. Tempel

(57) ABSTRACT

A server responds to a DHCP request for an IP address by setting a subnet in accordance with whether the client's MAC address is recognized as previously having been authenticated or otherwise associated with a policy. If the client has not been authenticated, the server provides a captive portal to enforce authentication. A routing device positioned in the network between clients and the server controls access to network resources by routing communications from clients in accordance with subnet addressing, where each subnet is associated with a policy.

15 Claims, 5 Drawing Sheets

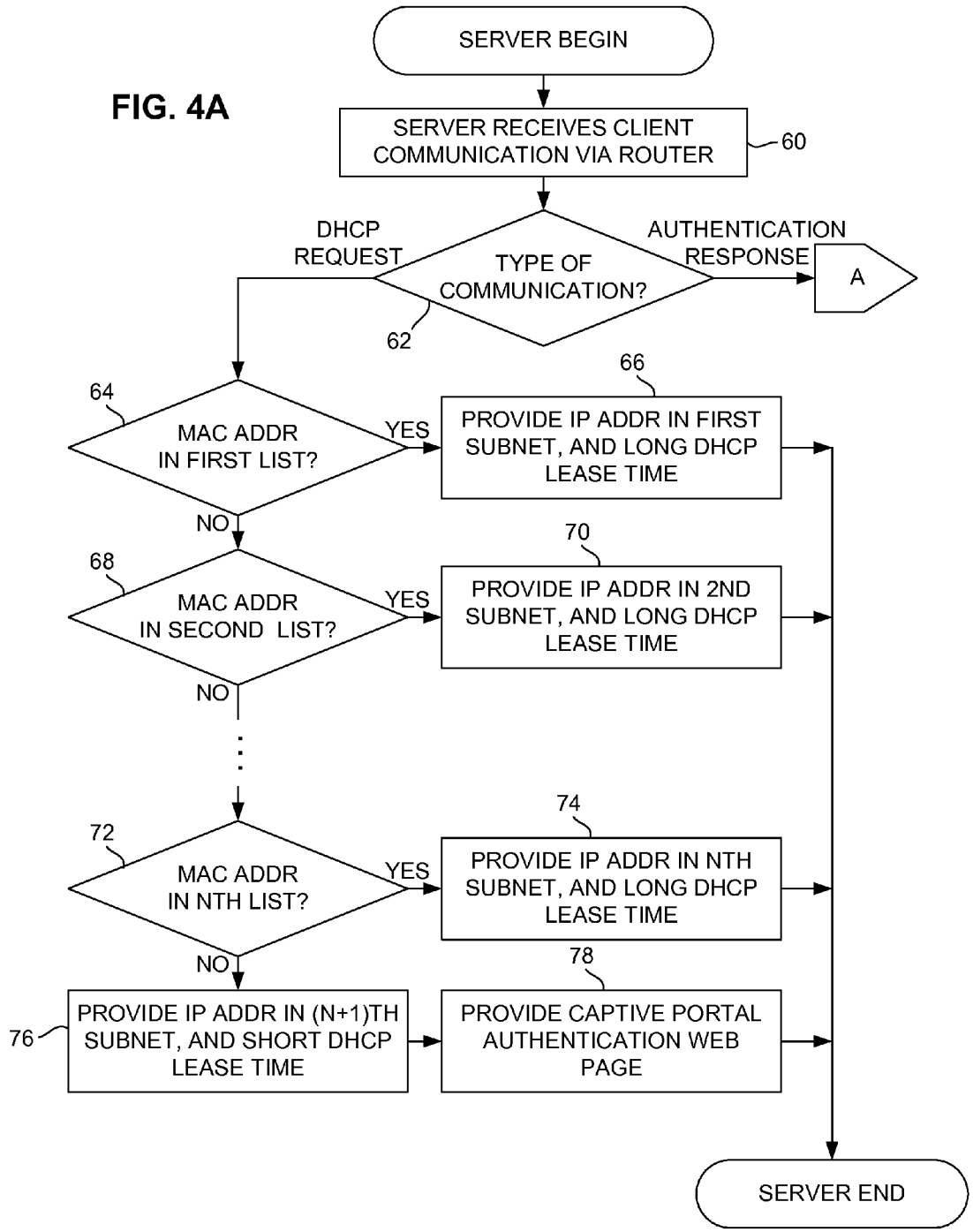

NETWORK ACCESS CONTROL USING SUBNET ADDRESSING

BACKGROUND

Network security relates to policies adopted by a network administrator or other party charged with authority for operating a computer network. The most common policies involve restricting access to network resources to only those individuals who have authorization to access them. A process known as authentication is commonly employed to restrict network access. In an authentication process, a user is prompted to provide secure identifying information, most commonly consisting of the combination of a user name and password. If the user-entered identifying information matches pre-stored identifying information associated with that user, the network enables access to a set of network resources. In a Web-based client-server system, a server or similar computer may provide a Web-based interface known as a captive portal. In a captive portal system, the captive portal Web page prompts the user to enter a user name and password on the client device. The captive portal system prevents the user from accessing other Web pages unless the user name and password entered by the user is determined to match a pre-stored user name and password. Captive portal systems are especially common in networks providing wireless local area network (WLAN) access.

Network security policies other than a straightforward password-based grant or denial of access are known. For example, a policy may grant certain users access to a certain set of network resources while preventing access by other users who are not authorized to access that set of resources. The terms "privileged user" and "standard user" are commonly used to distinguish between two classes or groups of users. For example, a privileged user may be a network administrator or other user authorized to access network resources that standard users are not authorized to access. Policy enforcement based on such a distinction is sometimes referred to as role-based policy enforcement.

As illustrated in FIG. 1, network 10 can include, for example, a gateway or secure controller 12 interposed between a network switch 14 and a router 16. Secure controller 12 controls authentication and otherwise enforces security policies to control access by client devices 18, 20, 22, etc., to network resources. In the exemplary network 10, secure controller 12 controls client device access to the Internet via router 16.

Network access control in a network topology such as that of network 10 is known as "in-band" because all communications (i.e., data packets) between client devices 18, 20, 22, etc., and the Internet or other protected resource pass through secure controller 12. In other words, secure controller 12 is interposed within the data communications band. In-band network access control suffers from a number of disadvantages. For example, including a specialized secure controller 12, i.e., a complex electronic device that is not a standard network device such as a switch, router, gateway, etc., is uneconomical, especially if redundancy is employed to mitigate the effect of potential failure of secure controller 12.

As illustrated in FIG. 2, in another exemplary network 24, a controller 26 provides out-of-band network access control, as controller 26 is not interposed in the communications band between client devices 28, 30, 32, etc., and the router 34. Controller 26 is essentially a client device that communicates with logic 38 (e.g., a software-based or firmware-based structure) in the switch 40 or other network devices via an application program interface (API). A disadvantage of such a system is that providing network infrastructure (i.e., devices), such as switch 40, with an API through which they can communicate with external devices renders such devices susceptible to malicious third-party access, colloquially referred to as hacking. Also, controller 26 may require complex configuration by a network administrator. Furthermore, while controller 26 is capable of communicating with logic 38 to effect network security, controller 26 may be incapable of communicating with or otherwise controlling a different switch (not shown) or other network device. A switch or other network device produced by one manufacturer may have significantly different logic from such a device produced by another manufacturer, thus requiring a different API.

It would be desirable to provide out-of-band network access control that is readily configurable and that is infrastructure-agnostic, i.e., operates in a similar manner irrespective of the network infrastructure.

SUMMARY

Embodiments of the invention relate to a system, method, and computer program product for controlling access of a client device to a data network using sub-network ("subnet") addressing. In an illustrative or exemplary embodiment, a server device receives a client communication via a routing device and determines whether the client communication includes a request for a network address. If the server device determines that the client communication includes a request for a network address, the server device determines whether a client identifier included in the first client communication is included in a first group of client identifiers. If the server device determines that the client identifier is included in the first group of client identifiers, the server device transmits to the client device via the routing device a response providing a network address within a first subnet associated with a first policy. If the server device determines that the client identifier is not included in the first group of client identifiers, the server device transmits to the client device via the routing device a response providing a network address within a second subnet associated with a second policy.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

FIG. 4A is a flow diagram illustrating a method of operation of the network access control system in the network of FIG. 3, in accordance with the exemplary embodiment of the invention.

DETAILED DESCRIPTION

Figure 1:
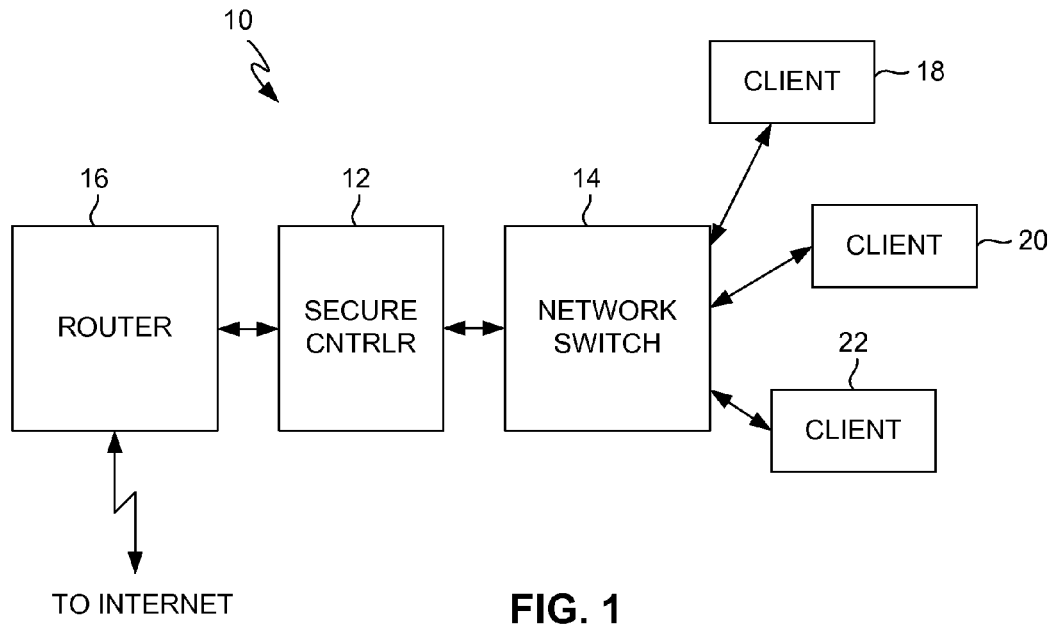
FIG. 1 is a block diagram of a network having a network access control system in accordance with the prior art.
Figure 2:
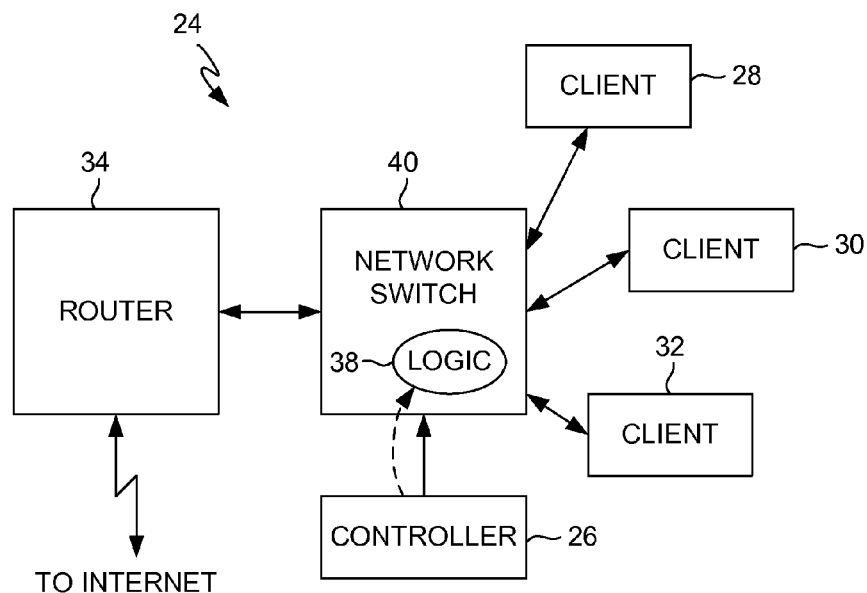
FIG. 2 is a block diagram of another network having a network access control system in accordance with the prior art.
Figure 3:
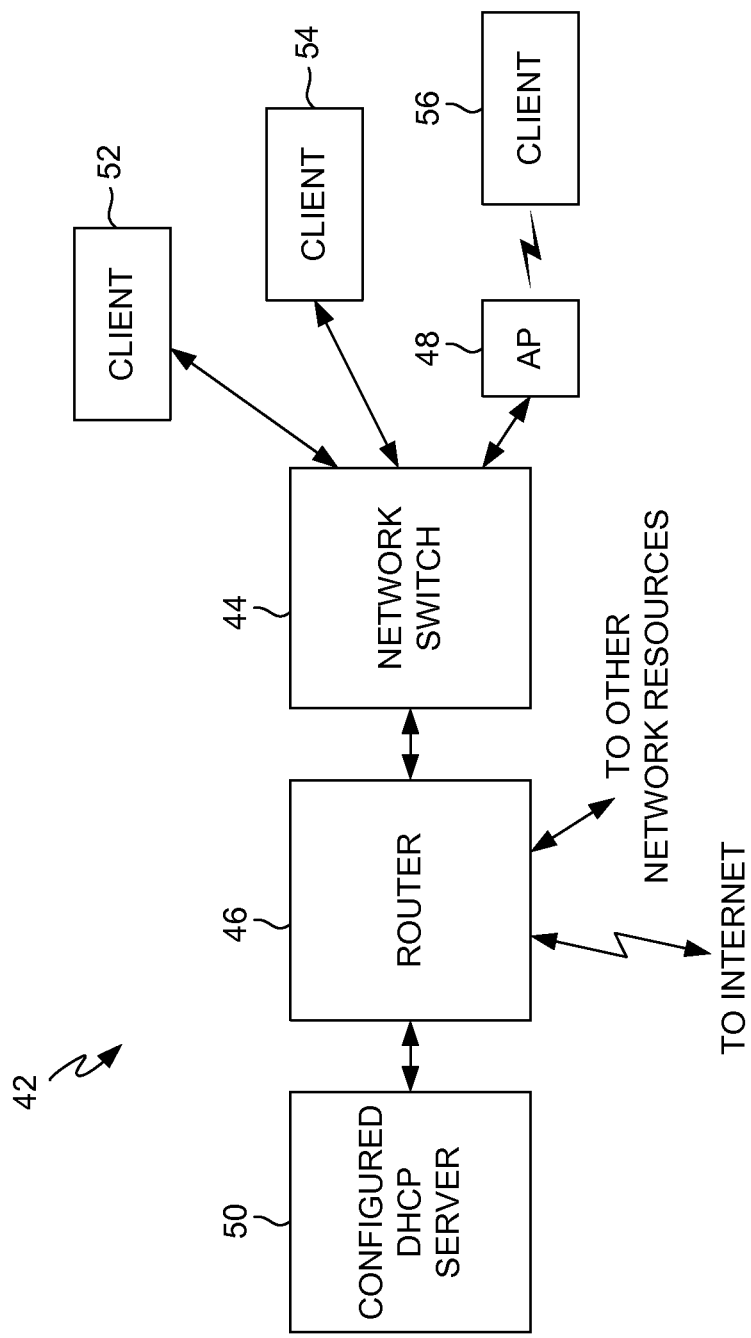
FIG. 3 is a block diagram of a network having a network access control system in accordance with an exemplary embodiment of the invention.

As illustrated in FIG. 3, in an illustrative or exemplary embodiment of the invention, a data network 42 includes a network switch 44, a router 46, a wireless access point (AP) 48, and a DHCP server 50 that is configured to operate in the manner described below. As well understood in the art, DHCP or Dynamic Host Configuration Protocol is a standard under which a server can operate to dynamically distribute network configuration parameters, such as Internet Protocol (IP) addresses, to network devices. A server configured in accordance with DHCP to perform such a distribution function in a network is commonly referred to as a DHCP server. Although for illustrative purposes only the foregoing network devices are included in network 42 in the exemplary embodiment, in other embodiments such a network can include any other devices of the types commonly included in data networks. Any number of such devices can be included, and such devices can be interconnected in any suitable network topology to define the network infrastructure. For example, although only one AP 48 is shown, such a network can include more than one AP. Also, for example, although network switch 44 is included in the exemplary embodiment, in other embodiments network switch 44 can be omitted.

Also, although in the exemplary embodiment router 46 performs the routing functions described below, in other embodiments any other type of routing device that performs such functions can be included instead of a router. The term "routing device" as used herein includes within its scope of meaning not only a device conventionally characterized as a "router" but also any network device that is capable of performing Layer-3 IP routing, including, for example, some types of switches and access points.

One or more client devices 52, 54, 56, etc., can connect to network 42 via network switch 44 and router 46. Client devices 52, 54, 56, etc., can comprise, for example, desktop, laptop or other computers, smartphones, smart appliances, or any other suitable types of devices that can operate in a client role in a client-server system. Although for illustrative purposes only client device 56 is shown connected to network 42 via AP 48, any of client devices 52, 54, 56, etc., can connect to network 42 via AP 48 or another such AP (not shown) or in any other suitable wireless or wired manner.

As described below, DHCP server 50 provides out-of-band network access control in network 42 by controlling the manner in which client devices 52, 54, 56, etc., can access network resources via router 46. For purposes of illustration, in the exemplary embodiment router 46 routes communications, i.e., data packets, between network 42 and the Internet. That is, in the exemplary embodiment, a communication path to the Internet serves as an example of a network resource to which access can be controlled. However, in other embodiments (not shown) a similar router can route communications between a similar network and other network resources, such as an intranet or a data storage system, instead of or in addition to the Internet.

Figure 4B:
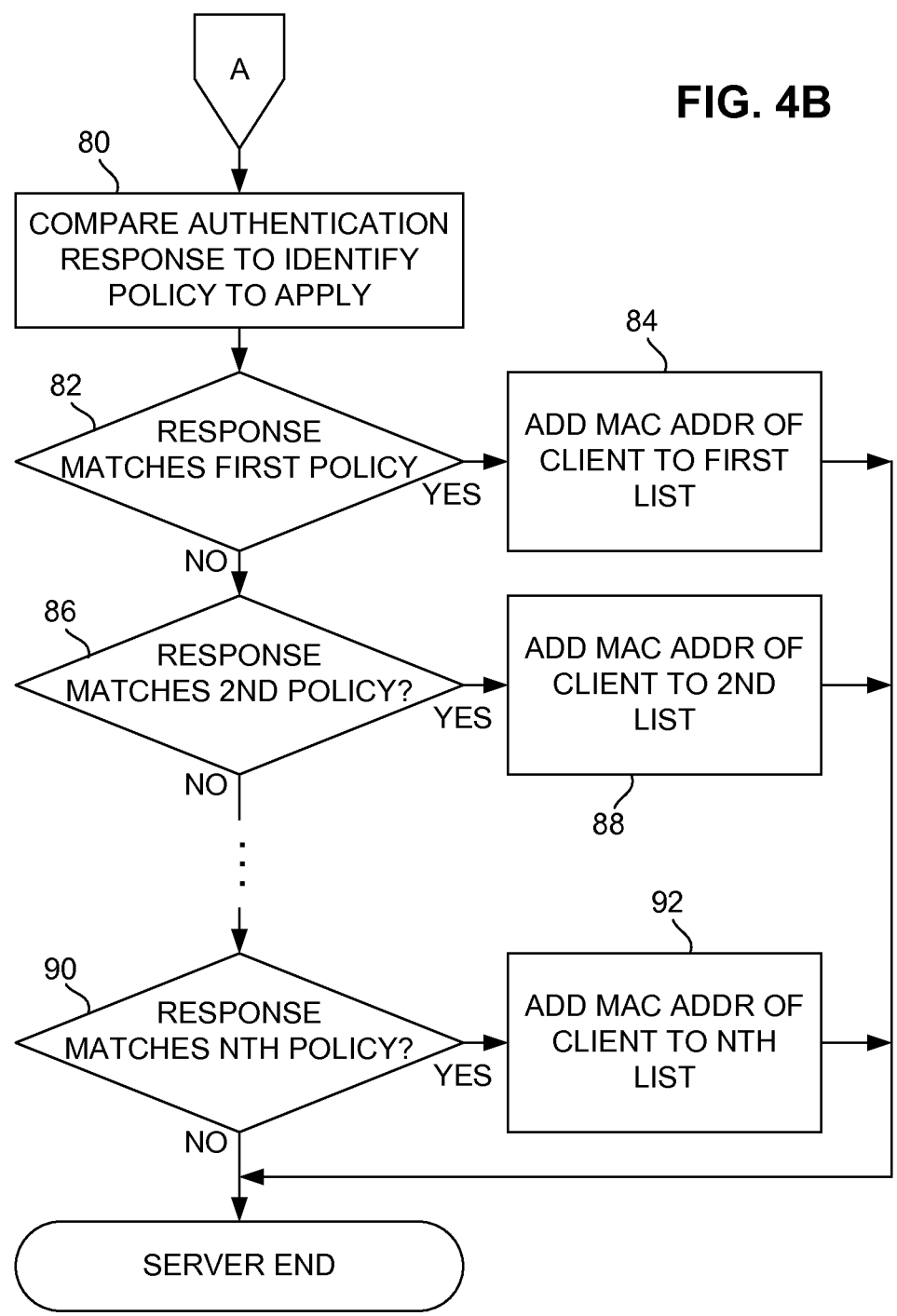
FIG. 4B is a continuation of the flow diagram of FIG. 4A.

The flow diagram of FIGS. 4A-B illustrates an exemplary method by which DHCP server 50 can operate in network 42. In an exemplary instance, one of client devices 52, 54, 56, etc., initially attempts to access the Internet or other network resource to which access is controlled. As indicated by block 60 in FIG. 4A, DHCP server 50 receives a request for an IP address that was initiated by one of client devices 52, 54, 56, etc. For example, client device 52 may attempt to access the Internet but has not yet been authenticated. In such an instance, client device 52 may broadcast a request for an IP address in accordance with conventional DHCP operation.

As well understood in the art, DHCP is a client-driven protocol in which a client device initiates a request for an IP address under certain conditions, such as when initially connecting to a network or upon expiration of a previous DHCP lease time. In the exemplary embodiment, each of client devices 52, 54, 56, etc., can operate in a conventional manner and initiate such DHCP requests in a conventional manner. As persons skilled in the art understand the implementation and operation of DHCP in client devices 52, 54, 56, etc., such details are not described herein.

Also, as the various phases of a DHCP session are well understood in the art, client-server communications defining these phases are simplified or generalized in the following descriptions for the sake of clarity and brevity. For example, it is well understood that a DHCP session commonly involves four phases: a client-initiated broadcast of a "discovery" message; a server-initiated "offer" to the client of an IP address in response to the discovery message; a client-initiated "response" to the server in response to the offer message; and a server-initiated "acknowledgement" to the client in response to the response message. Nevertheless, for the sake of clarity and brevity herein a DHCP session is generalized in the following description as comprising a client-initiated request for an IP address followed by a response in which DHCP server 50 provides an IP address.

As indicated by block 62, DHCP server 50 determines whether a received message (i.e., a group of one or more IP data packets) relates to a request for an IP address. DHCP server 50 assigns IP addresses within subnets, wherein each subnet is associated with a different policy relating to control of access to network resources. DHCP server 50 maintains or stores one or more lists of addresses or similar identifiers that uniquely identify client devices. Such an address can be, for example, a client device's media access control (MAC) address. Router 46 can be configured to enable a conventional feature known as "DHCP relay." As well understood by persons skilled in the art, enabling the DHCP relay feature on router 46 causes router 46 to include the client device's MAC address in packets that router 46 routes. But for having the DHCP relay feature enabled, router 46 can be configured in a conventional manner and can operate in a conventional manner. Thus, router 46 routes packets in an essentially conventional manner, based on subnet addressing and other conventional features. Likewise, network switch 44 is configured in the exemplary embodiment to operate in a conventional manner.

Each list corresponds to a policy relating to controlling access to network resources. For example, one policy can be that the network is to deny access by an unauthenticated client device to essentially all network resources, such as a communication path to the Internet. Another policy can be, for example, that the network is to enable access by client devices identified as "privileged" to a set of network resources to which client devices identified as "standard" (i.e., not privileged) are denied access. Still other policies can relate, for example, to quality-of-service (QoS), cost-of-service (CoS), and any other aspect of client operation that is controllable in accordance with network access control principles. A MAC address in one of the lists indicates that access to network resources by a client device having that MAC address is controlled in accordance with the policy corresponding to that list.

As indicated by block 64, if DHCP server 50 determines (block 62) that the received message relates to a request for an IP address, then DHCP server 50 determines whether the MAC address of the message's sender (i.e., client device) exists in a first list. As indicated by block 66, if DHCP server 50 determines (block 64) that the MAC address of the message's sender exists in the first list, then DHCP server 50 provides the requester (i.e., client device) with an IP address in a first subnet associated with a first policy. As well understood in the art, IP subnets are defined by a most-significant bit group in the IP address. That is, all network devices that belong to the same subnet are addressed with the same most-significant bit group in the IP addresses. In the exemplary embodiment, these most-significant bit groups or subnets can be predefined or fixed, and DHCP server 50 can generate the remaining bits of the IP addresses in a conventional manner. As the concept of subnetting in IP networks and similar networks is well understood by persons skilled in the art, it is not described herein in further detail.

Access to network resources, such as, for example, access to the Internet, can be controlled via router 46 by configuring router 46 to enable or deny access based on subnet. Each network resource or set of two or more resources to which access is to be controlled can be addressed within the same subnet. Thus, for example, router 46 can enable access to the Internet by client devices having IP addresses in one or more subnets but can deny access to the Internet by client devices having IP addresses in one or more other subnets.

Also, in accordance with the DHCP protocol, DHCP server 50 provides the requester with a lease time for the IP address. Each policy can include an IP address lease time. For example, a policy that includes the network enabling access by an authenticated client identified as a privileged user (e.g., a network administrator) to all network resources can include providing a relatively long lease time. In the exemplary embodiment, the first policy (corresponding to the first list) can be such a policy. A relatively long lease time can be, for example, on the order of tens of minutes to several hours. Thus, if DHCP server 50 determines (block 64) that the MAC address of the message's sender exists in the first list, then DHCP server 50 provides the requester with a long lease time for the IP address.

As indicated by block 68, if DHCP server 50 determines (block 64) that the MAC address of the message's sender does not exist in the first list, then DHCP server 50 determines whether the MAC address of the message's sender exists in a second list. As indicated by block 70, if DHCP server 50 determines (block 68) that the MAC address of the message's sender exists in the second list, then DHCP server 50 provides the requester with an IP address in a second subnet. The second subnet is associated with a second policy. In the exemplary embodiment, in which a first policy includes enabling access by authenticated client devices identified as privileged to all network resources, a second policy can include, for example, enabling access by authenticated client devices to only a subset of network resources. For example, client devices that have not been identified as privileged can be granted access to a subset of network resources that includes all network resources except those to which only network administrators or similar users are to be granted access. (Users of client devices who are not network administrators or similarly "privileged" users are commonly referred to as "standard" users.) Still other policies can include enabling access by authenticated client devices to other subsets of network resources. Also, a policy that includes the network enabling access by authenticated clients to all or a subset of network resources can include providing a relatively long lease time for the IP address. For example, in the exemplary embodiment the second policy (corresponding to the first list) can be such a policy. Thus, if DHCP server 50 determines (block 68) that the MAC address of the message's sender exists in the second list, then DHCP server 50 provides the requester with a long lease time for the IP address.

More generally, in a system in which there are N lists (where N is a positive integer greater than zero), if DHCP server 50 determines that the MAC address of the message's sender does not exist in any of the first through (N−1)th lists, then DHCP server 50 determines whether the MAC address of the message's sender exists in the Nth list, as indicated by block 72. (The determinations of whether the MAC address of the message's sender exists in a third through an (N−1)th list and the actions performed in response to such determinations are not individually shown in FIG. 4A but are indicated by the ellipsis (" . . . ") symbol.) As indicated by block 74, if DHCP server 50 determines (block 72) that the MAC address of the message's sender exists in the Nth list, then DHCP server 50 provides the requester (i.e., client device) with an IP address in an Nth subnet. The Nth subnet is associated with an Nth policy. Also, if DHCP server 50 determines (block 72) that the MAC address of the message's sender exists in the Nth list, then DHCP server 50 provides the requester with a long lease time for that IP address.

As indicated by block 76, if DHCP server 50 determines that the MAC address of the message's sender does not exist in any of the first through Nth lists, then DHCP server 50 provides the requester (i.e., client device) with an IP address in an (N+1)th subnet. The (N+1)th subnet is associated with an (N+1)th policy. In the exemplary embodiment, the (N+1)th policy includes denying access by unauthenticated client devices to essentially all network resources. Also, if DHCP server 50 determines that the MAC address of the message's sender does not exist in any of the first through Nth lists, then DHCP server 50 provides the requester with a relatively short lease time for that IP address, such as, for example, on the order of a few minutes.

The terms "short" and "long" as used herein in the context of lease times are intended to be relative to each other. Persons skilled in the art understand that DHCP lease times for authenticated clients commonly range from tens of minutes to several days. Such persons are readily capable of selecting suitable "long" and "short" lease times based on well understood factors, such as the size of the network and anticipated number of client devices. Regardless of the selected length of a "long" lease time, a "short" lease time that applies to unauthenticated clients should be substantially shorter than a "long" lease time.

It should be understood that the numerical indices (e.g., "first," "second," "(N−1)th," "Nth," etc.) of the lists and associated policies used in the descriptions herein are intended only to be illustrative or exemplary. Thus, although in the exemplary embodiment the first list and associated first policy relate to authenticated and privileged client devices, in other embodiments any other list and associated policy can instead relate to authenticated and privileged client devices. Similarly, although in the exemplary embodiment the second list and associated second policy relate to authenticated but not privileged client devices, in other embodiments any other list and associated policy can instead relate to authenticated but not privileged client devices. Likewise, although in the exemplary embodiment the (N+1)th list and associated (N+1)th policy relate to unauthenticated client devices, in other embodiments any other list and associated policy can instead relate to unauthenticated client devices.

As indicated by block 78, in conjunction with providing the (unauthenticated) requester with an IP address in the (N+1)th subnet and a short lease time, DHCP server 50 also provides the requester with a captive portal authentication Web page (not shown). As well understood in the art, a captive portal is technique that effectively turns a Web browser into an authentication device. If one of client devices 52, 54, 56, etc., has not been authenticated and (via a browser) requests a Web page, DHCP server 50 responds by sending a redirect message to the client device, causing the client device to receive an authentication Web page. The authentication Web page prompts the user to enter a user name and password.

Referring again to block 60, DHCP server 50 can receive a response from one of client devices 52, 54, 56, etc., to the authentication Web page. As indicated by block 62, DHCP server 50 determines whether a received message (i.e., a group of one or more IP data packets) is a response to the authentication Web page. As indicated by block 80 in FIG. 4B, if DHCP server 50 determines (block 62) that a received message is a response to the authentication Web page, then DHCP server 50 compares the information included in the response to stored user name and password combinations. The stored user name and password combinations are grouped by policy. For example, a first group of user name and password combinations is associated with the first policy, a second group of user name and password combinations is associated with the second policy, etc. As indicated by block 82, DHCP server 50 determines whether a user name and password combination received in the response matches a stored user name and password combination in the first group. As indicated by block 84, if DHCP server 50 determines (block 82) that the received user name and password combination matches a stored user name and password combination in the first group, then DHCP server 50 adds the MAC address of the sender to the above-referenced first list.

As indicated by block 86, if DHCP server 50 determines (block 82) that the received user name and password combination does not match a stored user name and password combination in the first group, then DHCP server 50 determines whether the received user name and password combination matches a stored user name and password combination in the second group. As indicated by block 88, if DHCP server 50 determines (block 86) that the received user name and password combination matches a stored user name and password combination in the second group, then DHCP server 50 adds the MAC address of the sender to the above-referenced second list.

More generally, in a system in which there are N lists, if DHCP server 50 determines that the received user name and password combination does not match a stored user name and password combination in any of the first through (N−1)th groups, then DHCP server 50 determines whether the received user name and password combination matches a stored user name and password combination in the Nth group, as indicated by block 90. (The determinations of whether the received user name and password combination matches a stored user name and password combination in any of the third through (N−1)th groups and the actions performed in response to such determinations are not individually shown in FIG. 4B but are indicated by the ellipsis (" . . . ") symbol.) As indicated by block 92, if DHCP server 50 determines (block 90) that the received user name and password combination matches a stored user name and password combination in the Nth group, then DHCP server 50 adds the MAC address of the sender to the above-referenced Nth list. Note that if the received user name and password combination does not match a stored user name and password combination in any of the first through Nth groups, then DHCP server 50 does not add the MAC address of the sender to any of the lists of MAC addresses because the sender cannot be authenticated. The MAC address of an unauthenticated one of client devices 52, 54, 56, etc., is not present in any of the lists. Although not shown for purposes of clarity, in an instance in which one of client devices 52, 54, 56, etc., becomes de-authenticated, DHCP server 50 removes the MAC address from the list. Client de-authentication can occur in a conventional manner, such as by logout or timeout.

The above-described method of operation can be further described with regard to the following example. In this example, client device 52 begins in an unauthenticated state by transmitting a DHCP request for an IP address. DHCP server 50 receives the DHCP request via router 46. Note that router 46 routes such DHCP requests to DHCP server 50 in a conventional manner. DHCP server 50 responds to the request by generating and transmitting to client 52 an IP address in the (N+1)th subnet and with a short lease time because the MAC address of client 52 is not found in any of the first through Nth lists. DHCP server 50 further responds to the request by providing the captive portal Web page. If in response to the captive portal Web page DHCP server 50 receives an authentication response communication that includes a user name and password combination matching one of the first through Nth policies, then DHCP server 50 adds the MAC address of client device 52 to the corresponding one of the first through Nth lists. Until such time as DHCP server 50 receives an authentication response communication that includes a user name and password combination matching one of the first through Nth policies, DHCP server 50 will continue to respond to any further DHCP requests from client device 52 by providing an IP address in the (N+1)th subnet and with a short lease time. As a result of the short lease time, client device 52 soon transmits another DHCP request. However, once DHCP server 50 has added the MAC address of client device 52 to one of the first through Nth lists, indicating that client device 52 has been authenticated, DHCP server 50 responds to such a further DHCP request from client device 52 by generating and transmitting to client device 52 an IP address in the subnet corresponding to that list and with a long lease time.

It should be understood that the method described above is not intended to represent the entirety of the operation of DHCP server 50, network 42 or any portion thereof. Rather, the method described above represents only those operational aspects that are most directly related to the exemplary embodiment of the invention. Other operational aspects of DHCP server 50 (and network 42 and elements thereof), such as those that are conventional, may not be described herein, as they are well understood by persons skilled in the art. Except as otherwise stated herein, DHCP server 50, router 46, network switch 44, AP 48, etc., operate not only in the manner described above but also in a conventional manner. It should also be noted that although DHCP server 50 is configured with features beyond merely distribution of IP addresses in accordance with DHCP, "DHCP server" 50 is referred to by that name for convenience and brevity. Also, although in the exemplary embodiment DHCP server 50 operates in accordance with DHCP, in other embodiments such a server or similar device can operate in accordance with any other suitable protocol for distributing network addresses to network devices.

Figure 5:
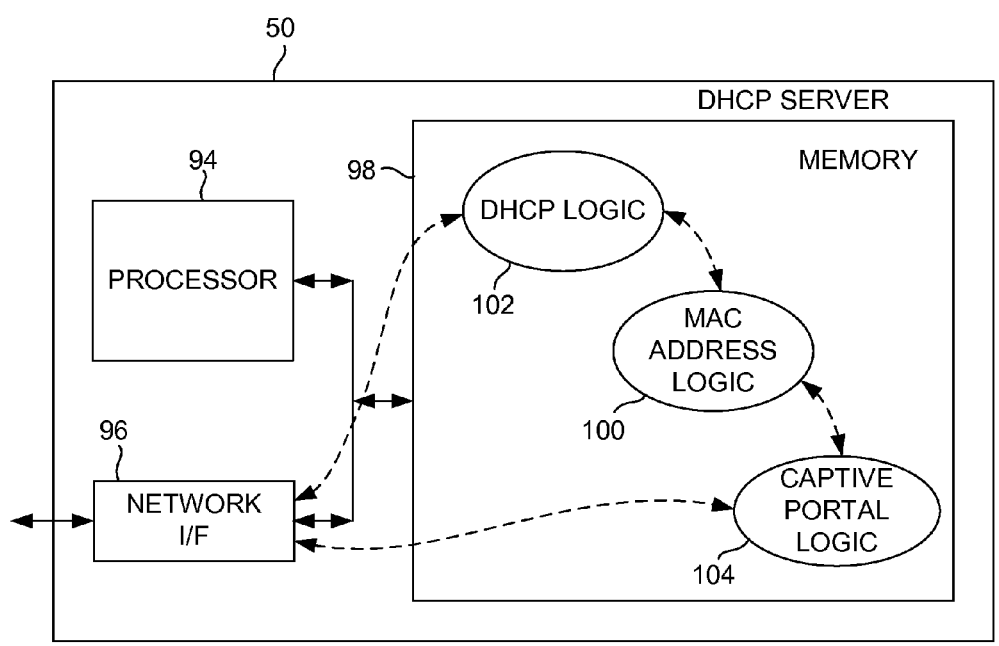
FIG. 5 is a block diagram of a server device of the network of FIG. 3.

As illustrated in FIG. 5, DCHP server 50 can include a processor 94, a network interface 96, and a memory 98. In addition to these elements, DCHP server 50 can include any other suitable elements commonly included in conventional server computers or similar devices. However, as the above-referenced elements are most directly related to the operation of the exemplary embodiment of the invention, only these elements are shown and described herein for purposes of clarity. Conventional elements, including some conventional logic, of DCHP server 50 are not shown or described herein, as they are well understood by persons skilled in the art. As well understood in the art, DCHP server 50 can communicate with router 46, which can in turn communicate with network switch 44. Client devices 52, 54, 56, etc., can communicate with router 46 via network switch 44. DCHP server 50 receives client communications (from client devices 52, 54, 56, etc.) via network switch 44 and router 46.

DCHP server 50 includes the following logic elements: MAC address management logic 100, DHCP logic 102, and captive portal logic 104. Although the logic elements are shown in FIG. 5 in a conceptual manner as stored in or residing in memory 98, persons skilled in the art understand that such logic elements arise through the operation of processor 94 under control of software or firmware and may not be present simultaneously or in their entireties in memory 98. Such software or firmware contributes to programming or configuring the processing system with such logic elements. Such software or firmware can be stored or otherwise embodied in any suitable non-transitory medium, including any suitable type of memory, and operated upon in memory 98 or other data storage in accordance with well-known computing principles. Such software or firmware can be loaded into memory 98 or other memory (not shown) in any suitable manner, such as during a configuration procedure preceding the method of operation described above with regard to FIGS. 4A-B. The curved arrows in FIG. 5 conceptually represent some of the communication of information that occurs among some of the logic and other elements of DCHP server 50.

It should be understood that the combination of memory 98 and the above-referenced logic elements or software, firmware, instructions, etc., underlying the logic elements, as stored in memory 98 in non-transitory computer-readable form, defines a "computer program product" as that term is understood in the patent lexicon. In view of the descriptions herein, persons skilled in the art will readily be capable of providing suitable software or firmware or otherwise configuring DHCP server 50 to operate in the manner described. Also, although the effect of each of the above-referenced logic elements is described herein, it should be understood that the effect may result from contributions of two or more logic elements, or from contributions of the logic elements and conventional network server logic elements or other network server features that are not shown for purposes of clarity.

DHCP logic 102 contributes to the configuring of DHCP server 50 to identify client communications that comprise requests for network addresses. MAC address management logic 100 contributes to the configuring of DHCP server 50 to identify one of a first through an Nth list in which the MAC address or other such client identifier of the client communication may be included. DHCP logic 102 further contributes to the configuring of DHCP server 50 to generate an IP address or other such network address within a subnet corresponding to the identified list or, if no such list is identified, to generate an IP address within another subnet, and to transmit the generated IP address to the requesting client device. Captive portal logic 104 contributes to the configuring of DHCP server 50 to transmit a response to the client device providing an authentication user interface if the client identifier of the client communication is not found in any of the first through Nth lists, and to determine whether a client response to the authentication user interface matches a user name and password combination or similar authentication response in a group associated with one of the first through Nth policies. MAC address management logic 100 further contributes to the configuring of DHCP server 50 to store the MAC address or other such client identifier of the client communication in one of the first through Nth lists if the authentication response is determined to match a response in a corresponding group.

One or more illustrative or exemplary embodiments of the invention have been described above. However, it is to be understood that the invention is defined by the appended claims and is not limited to the specific embodiments described.

What is claimed is:

1. A method for controlling access of a client device to a data network, comprising:
   receiving a first client communication via a routing device, the first client communication including a client identifier uniquely identifying the client device;
   determining whether the first client communication includes a request for a network address;
   in response to determining the first client communication includes a request for a network address, determining whether the client identifier included in the first client communication is included in a first group of client identifiers;
   in response to determining the client identifier included in the first client communication is included in the first group of client identifiers, transmitting to the client device via the routing device a response providing a network address within a first sub-network associated with a first policy;
   in response to determining the client identifier included in the first client communication is not included in the first group of client identifiers, transmitting to the client device via the routing device a response providing an authentication user interface and a network address within a second sub-network associated with a second policy;
   receiving a second client communication via the routing device, the second client communication including a client response to the authentication user interface and including the client identifier;
   determining whether the client response to the authentication user interface matches a response associated with a first policy; and
   in response to determining the client response to the authentication user interface matches the response associated with the first policy, including the client identifier in the first group of client identifiers.

2. The method of claim 1, further comprising:
   receiving a third client communication via the routing device after the second client communication, the third client communication including the client identifier;

determining whether the third client communication includes a request for a network address;

in response to determining the third client communication includes a request for a network address, determining whether the client identifier included in the third client communication is included in the first group of client identifiers;

in response to determining the client identifier included in the third client communication is included in the first group of client identifiers, transmitting to the client device via the routing device a response providing a network address within the first sub-network; and in response to determining the client identifier included in the third client communication is not included in the first group of client identifiers, transmitting to the client device via the routing device a response providing a network address within the second sub-network.

3. The method of claim 1, further comprising:

in response to determining the client identifier included in the first client communication is included in the first group of client identifiers, transmitting to the client device via the routing device a response providing a first network address lease time; and in response to determining the client identifier included in the first client communication is not included in the first group of client identifiers, transmitting to the client device via the routing device a response providing a second network address lease time, the second network address lease time shorter than the first lease time.

4. The method of claim 1, wherein:
the first policy is an authorized user policy; and
the second policy is an unauthorized user policy.

5. The method of claim 1, wherein the request for a network address comprises a dynamic host configuration protocol (DHCP) request.

6. A method for controlling access of a client device to a data network, comprising:

receiving a first client communication via a routing device, the first client communication including a client identifier uniquely identifying the client device;

determining whether the first client communication includes a request for a network address;

in response to determining the first client communication includes a request for a network address, determining whether the client identifier included in the first client communication is included in an Mth one of a first through an Nth group of client identifiers, wherein N is an integer greater than one and M is an integer greater than zero;

in response to determining the client identifier included in the first client communication is included in an Mth group of client identifiers, transmitting to the client device via the routing device a response providing a network address within an Mth sub-network associated with an Mth authorized user policy of a first through an Nth authorized user policy;

in response to determining the client identifier included in the first client communication is not included in any of the first through Nth groups of client identifiers, transmitting to the client device via the routing device a response providing an authentication user interface and a network address within a (N+1)th sub-network associated with an unauthorized user policy;

receiving a second client communication via the routing device, the second client communication including a client response to the authentication user interface and including the client identifier;

determining whether the client response to the authentication user interface matches a response associated with a first policy; and in response to determining the client response to the authentication user interface matches the response associated with the first policy, including the client identifier in the first group of client identifiers.

7. The method of claim 6, further comprising:

in response to determining the client identifier included in the first client communication is included in the Mth group of client identifiers, transmitting to the client device via the routing device a response providing a first network address lease time; and in response to determining the client identifier included in the first client communication is not included in any of the first through Nth groups of client identifiers, transmitting to the client device via the routing device a response providing a second network address lease time, the second network address lease time shorter than the first lease time.

8. The method of claim 6, further comprising:

receiving a third client communication via the routing device after the second client communication, the third client communication including the client identifier;

determining whether the third client communication includes a request for a network address;

in response to determining the third client communication includes a request for a network address, determining whether the client identifier included in the third client communication is included in an Mth one of the first through the Nth group of client identifiers;

in response to determining the client identifier included in the third client communication is included in an Mth group of client identifiers, transmitting to the client device via the routing device a response providing a network address within the Mth sub-network; and in response to determining the client identifier included in the third client communication is not included in any of the first through Nth groups of client identifiers, transmitting to the client device via the routing device a response providing a network address within the (N+1)th sub-network.

9. The method of claim 6, wherein the request for a network address comprises a dynamic host configuration protocol (DHCP) request.

10. A system for controlling access of a client device to a data network, comprising:

a processing system comprising a processor and memory, the processing system configured to include address configuration logic, address management logic, and captive portal logic, wherein:

the address configuration logic is configured to determine whether a first client communication received via a routing device and including a client identifier uniquely identifying the client device includes a request for a network address and further configured to respond to a request for a network address by transmitting to the client device via the routing device a response providing a network address;

the address management logic is configured to control storing the groups of client identifiers and to cause the address configuration logic to provide the network address within an Mth sub-network associated with an Mth authorized user policy of a first through an Nth authorized user policy if the client identifier included in the first client communication is included in an Mth one of a first through an Nth group of client identifiers, wherein N is an integer greater than one and M is an integer greater than zero, and to cause the address configuration logic to provide an authentication user interface and the network address within a (N+1)th sub-network associated with an unauthorized user policy if the client identifier included in the first client communication is not included in any of the first through Nth groups of client identifiers; and the captive portal logic is configured to transmit to the client device via the routing device a response providing an authentication user interface if the client identifier included in the first client communication is not included in any of the first through Nth groups of client identifiers, the captive portal logic is further configured to determine whether a second client communication comprising a client response to the authentication user interface matches a response associated with an Mth one of the first through Nth authorized user policies, and the address management logic is further configured to include the client identifier in the Mth group of client identifiers if the captive portal logic determines that the client response to the authentication user interface matches the response associated with an Mth one of the first through Nth authorized user policies.

11. The system of claim 10, wherein the address management logic is further configured to cause the address configuration logic to transmit to the client device via the routing device a response providing a first network address lease time if the client identifier included in the first client communication is included in the Mth group of client identifiers, and to transmit to the client device via the routing device a response providing a second network address lease time if the client identifier included in the first client communication is not included in any of the first through Nth groups of client identifiers, the second network address lease time shorter than the first lease time.

12. The system of claim 10, wherein:
the address configuration logic is configured to determine whether a third client communication received via the routing device following the second client communication and including the client identifier includes a request for a network address; and
the address management logic is further configured to cause the address configuration logic to respond to a request for a network address by transmitting to the client device via the routing device a response providing a network address within an Mth sub-network associated with an Mth authorized user policy of a first through an Nth authorized user policy if the client identifier included in the third client communication is included in an Mth one of a first through an Nth group of client identifiers, and by transmitting to the client device via the routing device a response providing a network address within a (N+1)th sub-network associated with an unauthorized user policy if the client identifier included in the third client communication is not included in any of the first through Nth groups of client identifiers.

13. The system of claim 10, wherein the request for a network address comprises a dynamic host configuration protocol (DHCP) request.

14. A computer program product for controlling access of a client device to a data network, the computer program product comprising a non-transitory computer-readable medium having stored thereon instructions that when executed by a processing system of a server device causes the server device to effectuate a method comprising:

receiving a first client communication via a routing device, the first client communication including a client identifier uniquely identifying the client device;

determining whether the first client communication includes a request for a network address;

in response to determining the first client communication includes a request for a network address, determining whether the client identifier included in the first client communication is included in a first group of client identifiers;

in response to determining the client identifier included in the first client communication is included in the first group of client identifiers, transmitting to the client device via the routing device a response providing a network address within a first sub-network associated with a first policy;

in response to determining the client identifier included in the first client communication is not included in the first group of client identifiers, transmitting to the client device via the routing device a response providing an authentication user interface and a network address within a second sub-network associated with a second policy;

determining whether a client response to the authentication user interface matches a response associated with a first policy; and in response to determining the client response to the authentication user interface matches the response associated with the first policy, including the client identifier in the first group of client identifiers.

15. The computer program product of claim 14, further comprising instructions that when executed by the processing system cause the server device to effectuate the method further comprising:

determining whether a third client communication including the client identifier and following the second client communication includes a request for a network address;

in response to determining the third client communication includes a request for a network address, determining whether the client identifier included in the third client communication is included in the first group of client identifiers;

in response to determining the client identifier included in the third client communication is included in the first group of client identifiers, transmitting to the client device via the routing device a response providing a network address within the first sub-network; and in response to determining the client identifier included in the third client communication is not included in the first group of client identifiers, transmitting to the client device via the routing device a response providing a network address within the second sub-network.

* * * * *